United States Patent
Schalk

[11] Patent Number: 5,925,830
[45] Date of Patent: *Jul. 20, 1999

[54] ELECTROMAGNETIC FLOWMETER CONSTRUCTION

[75] Inventor: Adelbert Schalk, Wutoschingen-Horheim, Germany

[73] Assignee: Georg Fischer Rohrleitungssysteme AG, Switzerland

[*] Notice: This patent issued on a continued prosecution application filed under 37 CFR 1.53(d), and is subject to the twenty year patent term provisions of 35 U.S.C. 154(a)(2).

[21] Appl. No.: 08/712,077

[22] Filed: Sep. 11, 1996

[30] Foreign Application Priority Data

Sep. 12, 1995 [CH] Switzerland ............... 2575/95

[51] Int. Cl.⁶ ............... G01F 1/58; G01F 1/56
[52] U.S. Cl. ............... 73/861.12; 73/861.08; 73/861.11; 73/861.13
[58] Field of Search ............... 73/861.08, 861.11, 73/861.12, 861.13

[56] References Cited

U.S. PATENT DOCUMENTS

| | | | |
|---|---|---|---|
| 4,343,767 | 8/1982 | Long et al. | 73/61.58 X |
| 4,388,834 | 6/1983 | Schmoock | 73/861.12 |
| 4,565,619 | 1/1986 | Gardner et al. | 73/861.12 X |
| 4,782,709 | 11/1988 | Goto et al. | 73/861.12 |
| 4,912,838 | 4/1990 | Goto et al. | 73/861.12 X |
| 5,062,305 | 11/1991 | Hansen et al. | 73/861.12 |
| 5,224,394 | 7/1993 | Kalinoski | 73/861.12 |
| 5,247,837 | 9/1993 | Corpron | 73/861.12 |
| 5,280,727 | 1/1994 | Hafner et al. | 73/861.12 |
| 5,583,299 | 12/1996 | Murase | 73/861.12 |

FOREIGN PATENT DOCUMENTS

| | | | |
|---|---|---|---|
| 60-71913 | 4/1985 | Japan | 73/861.12 |
| 5-99715 | 4/1993 | Japan | 73/861.12 |
| 190033 | 1/1967 | Russian Federation | 73/861.12 |
| 201691 | 11/1967 | Russian Federation | 73/861.12 |

*Primary Examiner*—Richard Chilcot
*Assistant Examiner*—Robin Clark
*Attorney, Agent, or Firm*—Gifford, Krass, Groh, Sprinkle, Anderson & Citkowski, P.C.

[57] ABSTRACT

A magnetic induction flowmeter to measure the rate of flow of a fluid features a plastic flow element (10) with a tubular section (12) adjoining a flow channel (18). Electrodes (22) penetrate the tubular section (12) and are positioned at a distance from each other in the flow channel (18). The electrodes (22) are made of an electroconductive material composed of a base material and an electroconductive supplemental substance finely distributed within said base material. The base material is identical to or is related to the plastic of the flow element (10) and the electrodes (22) are joined with the tubular section (12) of the flow element (10) to form a homogeneous material compound.

1 Claim, 1 Drawing Sheet

ELECTROMAGNETIC FLOWMETER CONSTRUCTION

BACKGROUND OF THE INVENTION

The invention pertains to a magnetic induction flowmeter to measure the rate of flow of a fluid, with a tubular section of a plastic flow element adjoining a flow channel and also with electrodes permeating the tubular section and positioned at a distance from each other in the flow channel. A method suitable for production of a magnetic induction flowmeter also lies within the scope of the invention.

In the case of magnetic induction flowmeters, the measurement principle requires a contact with the fluid medium at a minimum of two locations. In known flowmeters, metal pins or caps are used as electrodes in the flow element; these electrodes pass through the wall of the pipeline and are connected by electrical lines. In this case, the installation of the electrodes into the flow element is done either immediately during the manufacture of the flow element in an injection molding step, where the metal pins are installed into the mold and are enclosed by the molding compound, or the metal pins are subsequently pressed into the flow element.

One significant disadvantage of the known electrode contacts with metal elements is that a dependable seal between the metallic electrodes and the surrounding plastic of the flow element is not assured over a longer period of time. The leaks ultimately occurring will require disproportionately expensive repair activities.

SUMMARY OF THE INVENTION

Under consideration of these factors, the inventor understands the problem to be the creation of a magnetic induction flowmeter of the type described above, which will allow a low-cost contacting of the fluid medium while assuring a tight seal.

The solution to this problem as defined by this invention requires that the electrodes be made of an electroconductive material composed of a base material and an electroconductive, supplemental substance finely distributed within said base material, where the base material is identical to or is related to the plastic of the flow element and the electrodes are joined with the tubular section of the flow element to form a homogeneous material bond.

The material used in the manufacture of the electrodes in the present invention and composed of a base material as matrix and a supplemental material finely distributed therein is known in technical parlance as a compound.

The homogeneous material bond between the electrodes and the flow element, which is produced from the selection of identical or related plastics, leads to the desired tightness of the invented electrode contact. The flowmeter is suitable for all liquid media for which the plastics used have sufficient resistance. Since no spaces or back-cuts occur, a magnetic induction flowmeter can also be used for high purity media as well.

The homogeneous material bond between the electrodes and the tubular section of the flow element is preferably constructed as a melt zone.

It is expedient for the electrodes to have a free electrode surface essentially aligned with the inside wall of the tubular section of the flow element.

Carbon black, carbon fibers, metal powder or metal fibers are suitable as supplemental electroconductive material which is mixed in with the base material to produce the electroconductive material for the electrodes.

A metallic contact pin, for example, can be installed in the electrodes to establish an electrical connection outside the flow element.

In one preferred embodiment of a magnetic induction flowmeter, the electrodes are manufactured from the electroconductive material using an injection molding process and are joined with the flow element by means of a melt zone. In this case, the electrodes can be produced on a first injection molding machine, and subsequently in the production of the flow element, they are encased by the flow element on a second injection molding machine. In one production variant, the flow element is produced with recesses on an injection molding machine in a first injection molding process and subsequently, the electrodes are injected into the recesses in a second injection molding process. But the electrodes and flow elements can also be molded separately and subsequently joined together by means of a welding process.

DESCRIPTION OF THE DRAWINGS

Additional advantages, properties and details of the invention are found in the following description of preferred design examples with reference to the figures. These schematic figures are defined as follows.

DESCRIPTION OF THE INVENTION

Figure 1:
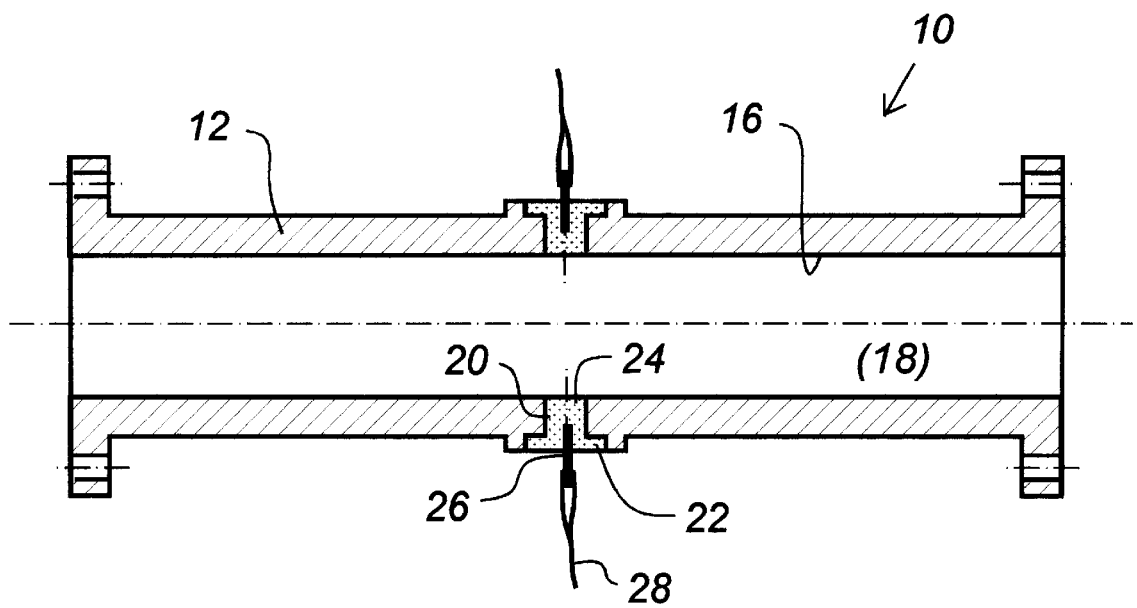
FIG. 1 A longitudinal cross section through a flow element of a magnetic induction flowmeter.

A flow element 10 illustrated in FIG. 1 features a tubular section 12 with front flanges 14 for installation into a pipeline system of a magnetic induction flowmeter (for reasons of conciseness, this meter is not illustrated in detail in the figure).

The tubular section 12 of the flowmeter 10 is drilled through at two diametrically opposing locations to form recesses 20. These recesses 20 are filled with an electrode 22 consisting of an electroconductive material 22. At the one inside wall 16 of the tubular section 12 adjoining the one flow channel 18, the electrodes 22 form mutually opposing electrode surfaces 24. The connection of the electrodes 22 to an electric cable 28 running outside the flow element 10 is done by means of a metallic contact pin 26 installed into the electrodes 22.

Figure 2:
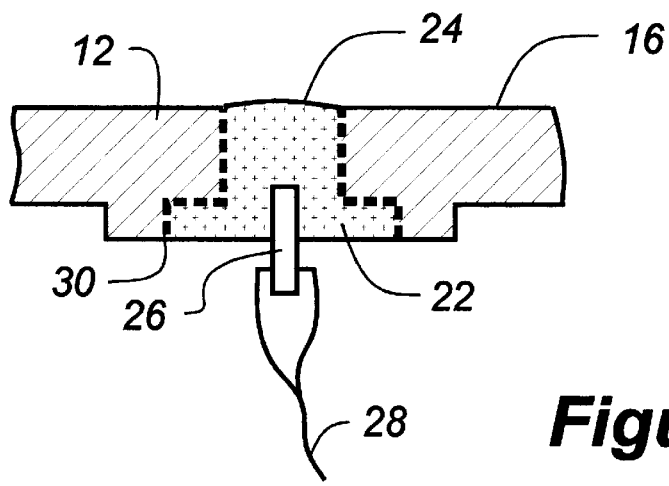
FIG. 2 An enlarged detail of FIG. 1.

As is indicated in particular in FIG. 2, the transition between the electrodes 22 and the adjoining, tubular section 12 and/or the edge of the recess 20, is formed by a melt zone 30. This zone of a homogeneous material bond is produced by local melting of the surface during the joining of the electrode 22 with the tubular section 12 of the measuring tube 10.

The electroconductive material of the electrode 22 consists of a base material, which is identical to or is related to the plastic used in the manufacture of the flow element 10, and also of an electroconductive, supplemental material present in finely distributed form. Selection of the supplemental material is governed by the required resistance of the device to the liquid media and can be, for example, carbon black, carbon fibers, metal fibers or a metal powder. Suitable base materials are, for example, FVDF, PFA and other plastics intended for use as pipeline materials.

The zone of homogeneous material bonding, that is, the melt zone 30 between electrode 22 and the tubular section 12 of the flow element 10, can be produced in different ways. Three possible process variants are described below.

1st method: Electrodes 22 of the electroconductive material are injection molded on a first injection molding machine. These electrodes are then placed into a second injection molding machine and the flow element 10 is molded on. In this case, the external skin of the electrode will heat up to the melting temperature and the desired, homogeneous material bond will be produced between electrode and flow element.

2nd method: The flow element is injection molded on an injection molding machine in a first molding process. Instead of the electrode 22, recesses 20 are used. While still warm, the flow element is placed into another mold cup of the same injection molding machine. In a second injection molding step, the electrodes 22 made of the electroconductive material are molded on. In this case, the outer mold skin of the flow element will heat up to the melting temperature, so that the homogeneous material bond will be produced between electrode and flow element.

3rd method: Electrodes 22 and flow element 10 are injection molded separately and are joined together by means of a welding process.

What is claimed is:

1. An electromagnetic flowmeter for measuring the flow rates of fluids, comprising;

a tubular section having a wall of a radial thickness and formed of synthetic plastic material, a pair of bores formed through said wall and arranged in diametrically opposed positions on said wall, said bores forming radially extending surfaces in the wall of said tubular section, an electrode disposed within each of said bores in the wall of the said tubular section and each of said electrodes having a radially extending exterior surface having a radial dimension which corresponds with the radial thickness of said tubular section, said electrodes formed of the same base material as said tubular section and an electroconductive additional substance finely distributed within said base material, said exterior surface of each of said electodes respectively engaging one of said surfaces of said tubular section defining said bores throughout the radial thickness of said wall, a melt zone formed between said exterior surface of each of said electrodes and said surface of said tubular section walls forming said corresponding bores by local melting of the corresponding surfaces, and said melt zone comprising the entire radially extending exterior sufaces of said electrodes and of the surfaces of said tubular section forming said bores whereby said melt zone extends for the entire radial thickness of said tubular section.

* * * * *

UNITED STATES PATENT AND TRADEMARK OFFICE
CERTIFICATE OF CORRECTION

PATENT NO. : 5,925,830

DATED : July 20, 1999

INVENTOR(S) : Adelbert Schalk

It is certified that error appears in the above-identified patent and that said Letters Patent is hereby corrected as shown below:

Column 2, line 39, delete "22".

Signed and Sealed this

Seventh Day of March, 2000

Attest:

Q. TODD DICKINSON

*Attesting Officer*

*Commissioner of Patents and Trademarks*